(12) United States Patent
Ni et al.

(10) Patent No.: US 8,456,421 B2
(45) Date of Patent: *Jun. 4, 2013

(54) SELECTION DEVICE AND METHOD

(75) Inventors: Tsang-Der Ni, Hsinchu (TW);
Deng-Huei Hwang, Taipei County (TW); Ruey-Der Lou, Hsinchu (TW); Wen-Hsiung Yu, Nantou (TW)

(73) Assignee: IMU Solutions, Inc., Hsinchu (TW)

( * ) Notice: Subject to any disclaimer, the term of this patent is extended or adjusted under 35 U.S.C. 154(b) by 753 days.

This patent is subject to a terminal disclaimer.

(21) Appl. No.: 12/506,696

(22) Filed: Jul. 21, 2009

(65) Prior Publication Data
US 2010/0033431 A1  Feb. 11, 2010

(30) Foreign Application Priority Data
Aug. 11, 2008  (TW) .............................. 97130594 A

(51) Int. Cl.
*G06F 3/033* (2006.01)
*G09G 5/08* (2006.01)

(52) U.S. Cl.
USPC .......................................... 345/158; 345/156

(58) Field of Classification Search
USPC ...................... 345/156–158, 163, 169, 173
See application file for complete search history.

(56) References Cited

U.S. PATENT DOCUMENTS

| | | | |
|---|---|---|---|
| 5,440,326 A | 8/1995 | Quinn | |
| 5,898,421 A | 4/1999 | Quinn | |
| 7,233,316 B2 | 6/2007 | Smith et al. | |
| 7,262,760 B2 | 8/2007 | Liberty | |
| 2005/0125826 A1 | 6/2005 | Hunleth et al. | |
| 2006/0092133 A1 | 5/2006 | Touma et al. | |
| 2008/0100825 A1 | 5/2008 | Zalewski | |
| 2008/0165153 A1 | 7/2008 | Platzer et al. | |

FOREIGN PATENT DOCUMENTS

| | | |
|---|---|---|
| JP | 06-044006 | 2/1994 |
| JP | 2006331432 | 12/2006 |
| WO | 2007013652 | 2/2007 |

OTHER PUBLICATIONS

Japanese Office Action, Oct. 4, 2011, English Translation Not Provided.
Japanese Office Action, Mar. 21, 2012, English Translation Not Provided.

*Primary Examiner* — Ricardo L Osorio
(74) *Attorney, Agent, or Firm* — Volpe and Koenig, P.C.

(57) ABSTRACT

A selection device for selecting an icon in an image area is provided including a motion-sensing unit and a processing unit. The motion-sensing unit senses a first motion and converts the first motion into a first signal. The processing unit converts the first signal into a first locus in the image area, determines a first area in the image area according to the first locus, and determines whether the icon is to be selected according to the first area and a second area where the icon is to be displayed in the image area.

20 Claims, 10 Drawing Sheets

SELECTION DEVICE AND METHOD

FIELD OF THE INVENTION

The present invention relates to a selection device and method, and more particularly to a device and method for selecting an image icon.

BACKGROUND OF THE INVENTION

For a long time, the common operation way of a conventional two-dimensional (2D) mouse device moved on a table is that the left push button of the mouse device is clicked twice quickly for performing the function of the icon after the cursor on the computer screen is positioned in the icon. Please refer to FIGS. 1(a) and 1(b), which are schematic diagrams showing conventional selection configurations 911 and 912 of an icon selection system 91. As shown in FIG. 1(a), the selection configuration 911 includes an image area 12, an image 13, a cursor 14 and a mouse device 17. The image 13 is displayed and filled in the image area 12 and includes plural icons 131, 132, 133, 134, 135 and 136. The mouse device 17 may be a 2D one, operated on a plane, or a three-dimensional (3D) one, operated in the air. Regarding the operation of selecting the icon 134, the motion purpose of the conventional mouse device 17 is to move the cursor 14 to the desired icon 134. Therefore, the motion of the mouse device 17 is to move the cursor 14 move along X or/and Y directions.

As shown in FIG. 1(b), the cursor 14 in the selection configuration 912 is used for selecting the icon 131, and the motion trace of the cursor 14, generally speaking, can include plural connected line segments such as those A1, A2, A3, A4, A5, A6, A7 and A8.

Recently, as the micro-electro-mechanical types of the accelerometer and the gyroscope are more popular, the so-called 3D mouse device, which senses the motion of the hand in the air thereby for controlling the computer screen pointer to select the icon and to perform the function of the icon, is developed gradually. However, comparing the 3D mouse device with the conventional 2D mouse device used on the table, there are main differences between their operations. The 2D mouse device moving on the table is always supported by the contacting surface of the table, thereby the cursor moved on the screen will not to deviate from the icon pointed when the push button of the 2D mouse is quickly clicked twice with a finger. In contrast, the handheld 3D mouse device operating in the air, does not have an additional support; then the cursor moving on the screen by the 3D mouse is easy to deviate from the location of the selected icon due to a careless hand motion when the push button is quickly clicked with a finger for performing the function of the icon, which will make a fault operation. Unfortunately, the user of a commercial product such as Air Mouse of Logitech Inc. is facing the problem.

In order to overcome the above-mentioned problem, some companies arrange an active push button on their products to improve the motion operation of the cursor; e.g. the 3D mouse device/Air Mouse commercial products provided by Gyration Inc. The method is as follows. While the 3D mouse device moves in the air and the active push button is also in a press state, then the cursor on the screen can move with the mouse device. While the cursor is positioned in the icon and the active push button is released, the cursor no longer moves with the mouse device. At this moment, clicking the push button performs the function of the icon even if the mouse device can move. Because relations between the cursor on the screen and the motion of the mouse device are disconnected from each other, the cursor can be positioned in the icon to cause the function to be performed successfully. Although this operation mode can cause the function to be performed correctly, this operation behavior practically violates the ergonomic motion. This operation is not only intermittent without continuity but also uncomfortable.

SUMMARY OF THE INVENTION

It is an object of the present invention to mark an area with a circle-shape motion locus or trajectory and cause the locus to encircle or pass through an icon to be selected, or the area enclosed by the locus covers the icon to be selected. After the icon is in a selected status, a motion is subsequently performed to cause a preset function of the icon to be launched, and the motion can be a movements of drawing a check mark "V", a letter "X", a circle "O", or other motion or gesture performed by arm and wrist. This operation method of present invention to select and execute the function of the icon is not only conforming with ergonomics, but also smooth, complete and accomplished at one stretch.

It is therefore an aspect of the present invention to provide a selection device for selecting an icon in an image area and the selection device includes a motion-sensing unit and a processing unit. The motion-sensing unit senses a first motion and converts the first motion into a first signal. The processing unit converts the first signal into a first locus in the image area, determines a first area in the image area according to the first locus, and determines whether the icon is to be selected according to the first area and a second area where the icon is to be displayed in the image area.

It is therefore another aspect of the present invention to provide a selection device for selecting an icon in an image area and the selection device includes a selection unit. The selection unit has a first motion, converts the first motion into a first locus in the image area, determines a first area of the image area according to the first locus, and determines whether the icon is to be selected according to the first area and a second area where the icon is to be displayed in the image area.

It is still another aspect of the present invention to provide a selection method for selecting an icon in an image area. The selection method includes the following steps. A first motion is converted into a first locus in the image area. A first area in the image area is determined according to the first locus. And, whether the icon is to be selected according to the first area and a second area where the icon is to be displayed in the image area is determined.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
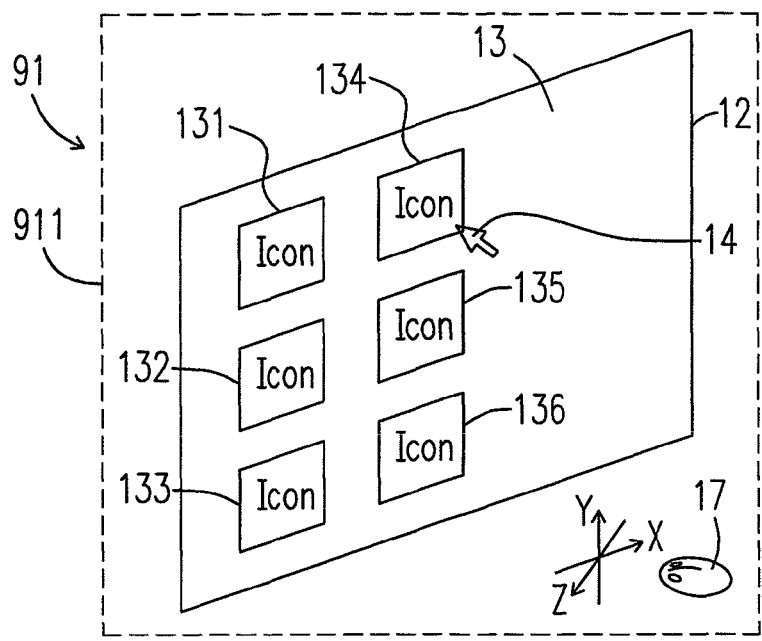
FIG. 1(a) and FIG. 1(b) are schematic diagrams showing selection configurations of a conventional selection system.
Figure 1B:
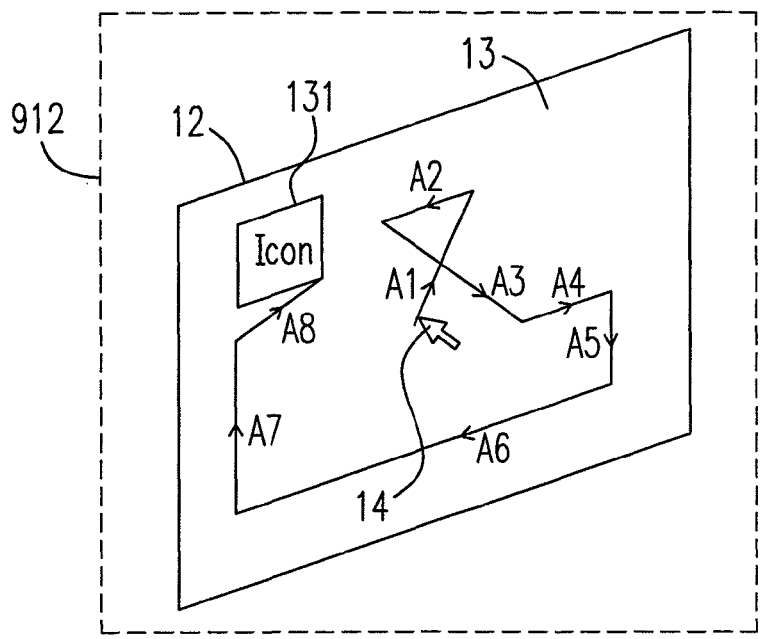
Figure 2:
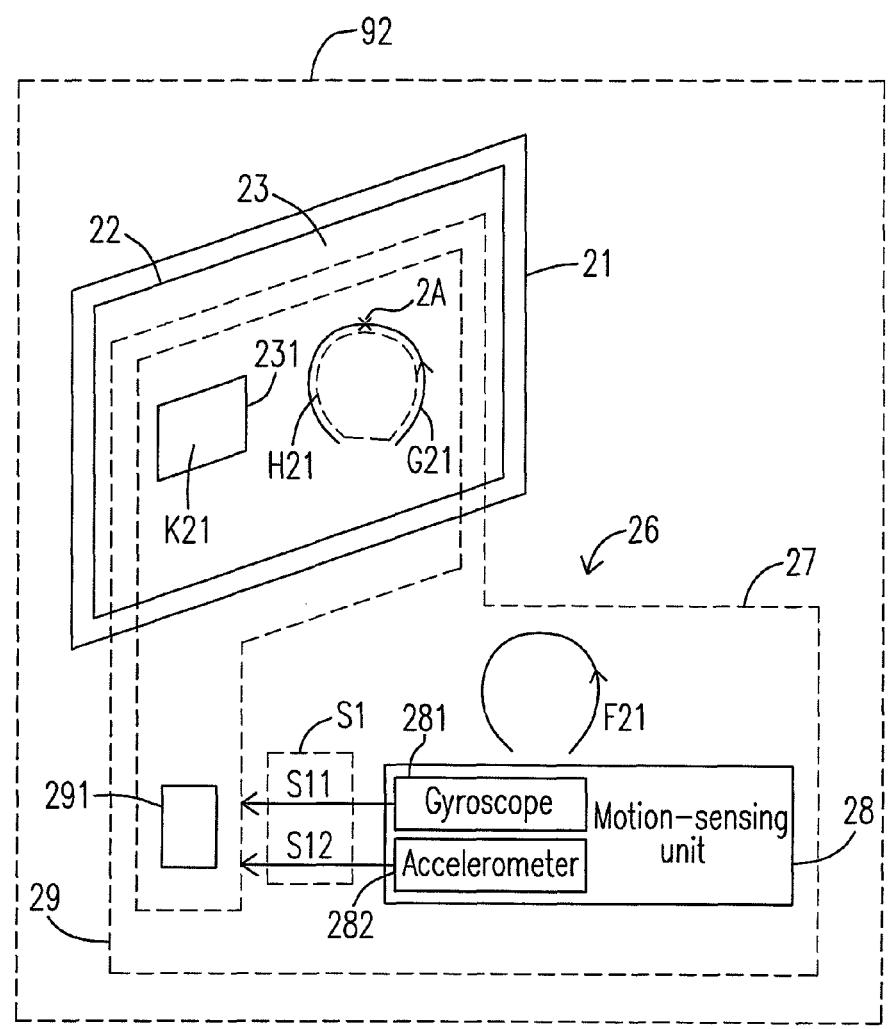
FIG. 2 is a schematic diagram showing a selection system according to the first embodiment of the present invention.

Please refer to FIG. 2, which is a schematic diagram showing a selection system 92 according to the first embodiment of the present invention. As shown, the selection system 92 includes a display screen 21 and a selection device 26. There is an image area 22, where an image 23 is to be displayed, within an area of the display screen 21. There is an icon 231 defined in the image 23, and there is a definable position 2A in the image area 22. The selection device 26 is used for selecting an icon 231 in the image area 22 and includes a selection unit 27.

The selection unit 27 has a motion F21, converts the motion F21 into a locus G21 of the definable position 2A, determines an area H21 in the image area 22 according to the locus G21, and determines whether the icon 231 is to be selected according to the area H21 and an area K21 where the icon 231 is to be displayed in the image area 22.

The selection unit 27 may includes a motion-sensing unit 28 and a processing unit 29. The motion-sensing unit 28 converts the motion F21 into a signal S1. The processing unit 29 converts the signal S1 into the locus G21, determines the area H21 according to the locus G21, and determines whether the icon 231 is to be selected according to the area H21 and the area K21. The processing unit 29 may includes a controller 291 which may include at least one selected from a group consisting of a microcontroller, a microprocessor, a digital signal processor and a central processing unit.

In an embodiment, the motion-sensing unit 28 includes a gyroscope 281, and the gyroscope 281 senses the motion F21 for producing the signal S1. In an embodiment, the motion-sensing unit 28 includes an accelerometer 282, and the accelerometer 282 senses the motion F21 for producing the signal S1. In an embodiment, the motion-sensing unit 28 includes the gyroscope 281 and the accelerometer 282. The gyroscope 281 has at least two sensing degrees of freedom and senses the motion F21 for producing a first portion S11 of the signal S1. The accelerometer has at least two sensing degrees of freedom and senses the motion F21 for producing a second portion S12 of the signal S1.

A hand (not shown) may drive the selection unit 27 to form the motion F21 of the selection unit 27. The motion F21 may include at least one of a three-dimensional motion and a two-dimensional motion. The locus G21 of the definable position 2A may include at least one selected from a group consisting of a first arc having an arc angle, a combination of a second arc and a first line segment, and plural second line segments. The arc angle of the first arc is in a degree being one selected from a group consisting of 360°, near 360°, and beyond 360° when the locus G21 is the first arc.

The area H21 determined by the locus G21 includes a closed area, and the icon has the area K21. The selection unit 27 causes the icon 231 to be selected when in a specific condition, wherein the specific condition is one selected from a group consisting of: a first condition that the areas H21 and K21 are partially overlapping, a second condition that the areas H21 and K21 are entirely overlapping, a third condition that the area H21 is entirely covering the area K21, a fourth condition that a centroid of the area H21 is within the area K21, a fifth condition that the locus G21 passes through the area K21, and a sixth condition that the locus G21 touches the area K21.

In an embodiment, the selection device 26 includes a motion-sensing unit 28 and a processing unit 29. The motion-sensing unit 28 senses the motion F21 and converts the motion F21 into the signal S1. The processing unit 29 converts the signal S1 into the locus G21 of the definable position 2A in the image area 22, determines the area H21 in the image area 22 according to the locus G21, and determines whether the icon 231 is to be selected according to the area H21 and an area K21 where the icon 231 is to be displayed in the image area 22. The motion F21 sensed by the motion-sensing unit 28 may be generated by at least one selected from a group (not shown) consisting of a hand, an arm, a foot, a leg, a head, a neck, a shoulder and a waist.

Figure 3:
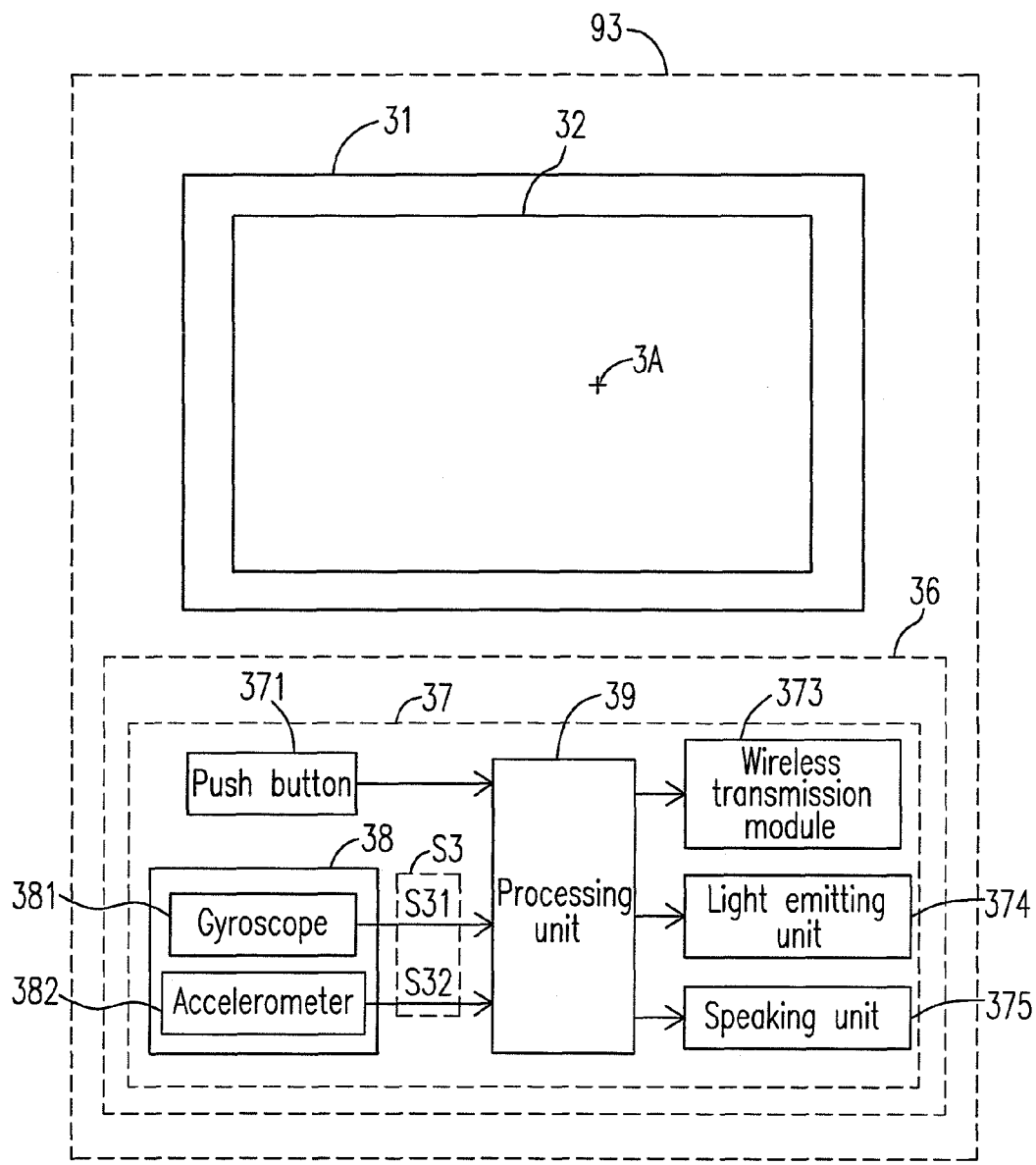
FIG. 3 is a schematic diagram showing a selection system according to the second embodiment of the present invention.

Please refer to FIG. 3, which is a schematic diagram showing a selection system 93 according to the second embodiment of the present invention. As shown, the selection system 93 includes a display screen 31 and a selection device 36. There is an image area 32 within an area of the display screen 31, and there is a definable position 3A in the image area 32, wherein the definable position 3A may be defined to any position in the image area 32.

The selection device 36 includes a selection unit 37. The selection unit 37 includes a push button 371, a motion-sensing unit 38, a processing unit 39, a wireless transmission module 373, a light emitting unit 374 and a speaking unit 375. Each of the push button 371, the motion-sensing unit 38, the wireless transmission module 373, the light emitting unit 374 and the speaking unit 375 is coupled to the processing unit 39.

The motion-sensing unit 38 has the ability to sense a three-dimensional (x, y, z) motion and provides a signal S3 to the processing unit 39. The motion-sensing unit 38 at least includes a gyroscope 381 and/or an accelerometer 382, wherein either the gyroscope 381 or the accelerometer 382 may have one, two or three independent sensing degree(s) of freedom. The gyroscope 381 and the accelerometer 382 provide a sub-signal S31 and a sub-signal S32 of the signal S3 respectively to the processing unit 39.

Figure 4A:
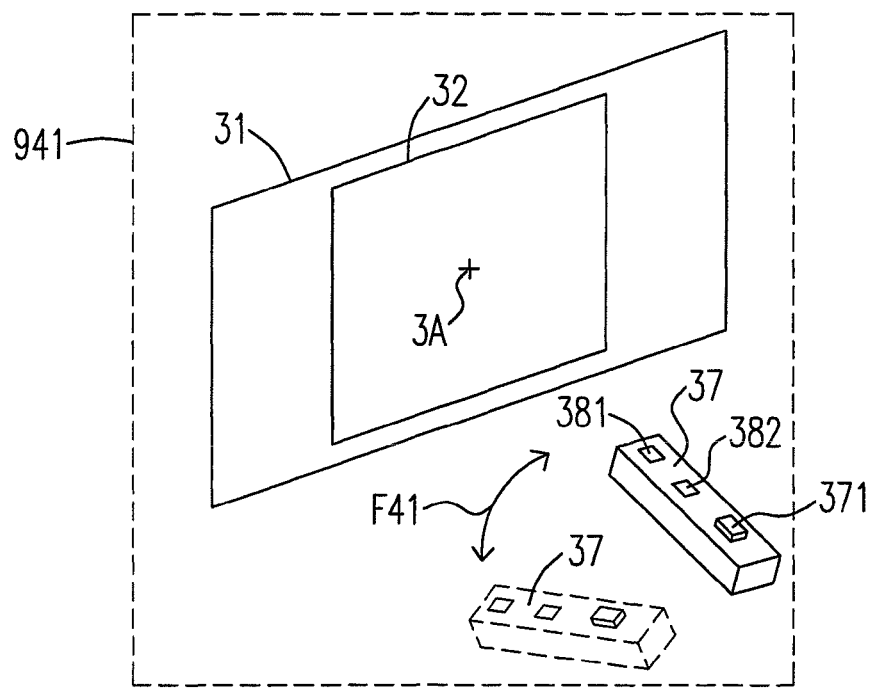
FIG. 4(a) and FIG. 4(b) are schematic diagrams showing initialization configurations of the selection system according to the second embodiment of the present invention.
Figure 4B:
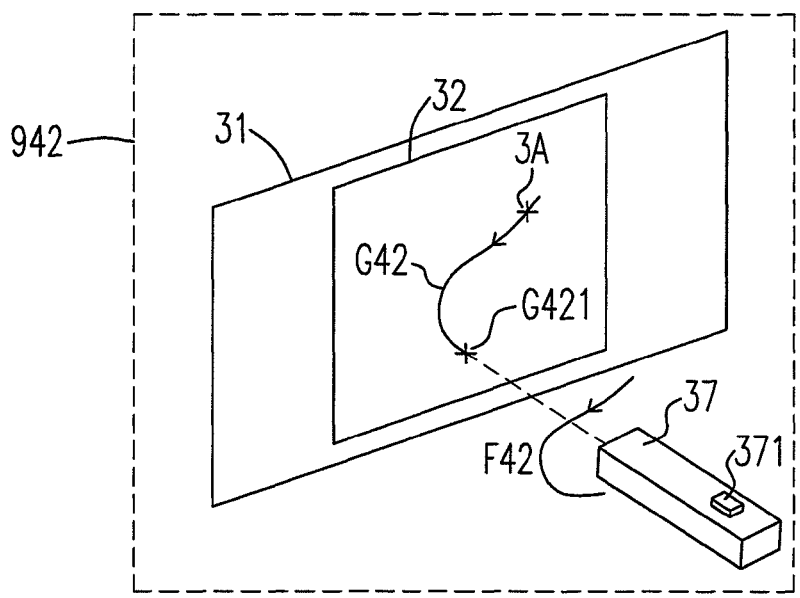

Please refer to FIG. 4(a) and FIG. 4(b), which are schematic diagrams showing initialization configurations 941 and 942 of the selection system 93 according to the second embodiment of the present invention. As shown in FIG. 4(a), in order to initialize or start the motion sensing, the push button 371 of the selection unit 37 can be pushed to start sensing, or a certain motion is used to start sensing. In other words, the certain motion may be sensed by the accelerometer 382 and recognized by means of interpreting the acceleration/deceleration in order to start the sensing function. For instance, an up-down pitching motion F41 is used to start the motion-sensing function of the selection unit 37.

As shown in FIG. 4(b), after the motion-sensing function of the selection unit 37 starts, a locus G42 of the definable position 3A in the image area 32 corresponds to a locus of the motion F42 of the selection unit 37, and a reference point G421 of the locus G42 may be set up. The absolute coordinate of the terminating point of the locus G42 swept by the selection unit 37 is read through pushing the push button 371, and the terminating point is taken to be the reference point G421 for starting positioning.

Figure 5:
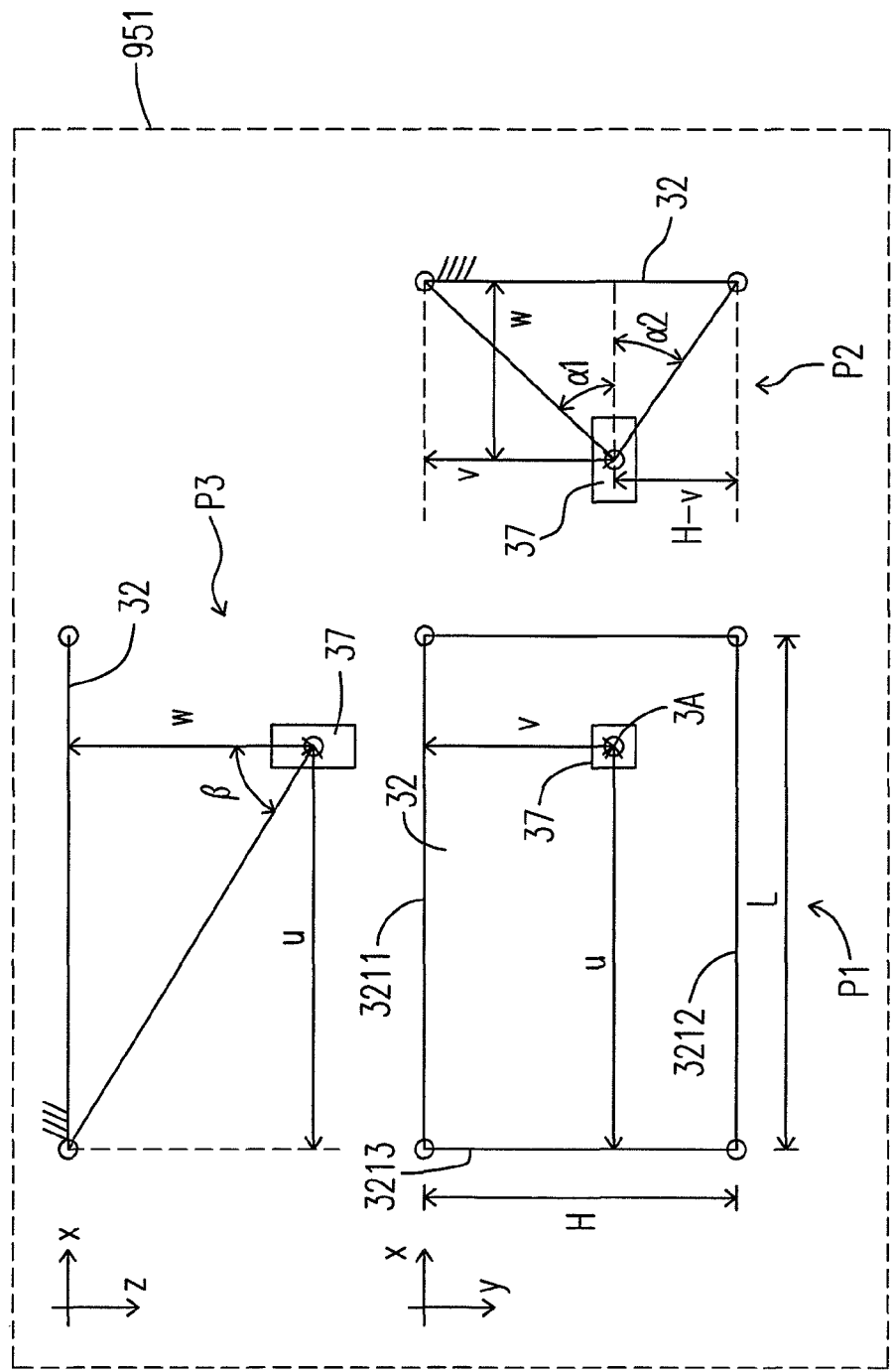
FIG. 5 is a schematic diagram showing a correspondence configuration of the selection system according to the second embodiment of the present invention.

Please refer to FIG. 5, which is schematic diagram showing a correspondence configuration 951 of the selection system 93 according to the second embodiment of the present invention. As shown, the correspondence configuration 951 includes a front view configuration P1, a right view configuration P2 and a top view configuration P3. The initial position value of the reference point G421 is determined and the definable position 3A is correlated with a posture of the motion of the selection unit 37 through deriving the correspondence relation between the range of the image area 32 and the operation range of the selection unit 37.

In FIG. 5, the symbols H and L denote the dimensions, the length and the width (e.g., in pixel basis), of the image area 32 respectively. The symbols u, v and w denote the respective distances between the selection unit 37 and three consisting of the left 3213 and the upper 3211 edges of the image area 32 and the display screen 31 (perpendicular) thereof. The symbols a1, a2 and β denote the respective included angles between the selection unit 37 and three consisting of the upper 3211, the lower 3212 and the left 3213 edges of the image area 32, wherein the angles a1 and a2 may be measured by the accelerometer 382 of the selection unit 37, and the angle β may be measured by the gyroscope 381. The correspondence relation between the posture of the motion of the selection unit 37 and the definable position 3A in the image area 32 may be obtained through the calculation of the geometric relation in FIG. 5 as follows: u=H tan β/(tan a1+tan a2); v=H tan a1/(tan a1+tan a2); w=H/(tan a1+tan a2).

The variation of the set (u, v, w) forms the relative displacement set (Δx, Δy, Δz). The absolute coordinate (x, y, z) of the definable position 3A may be obtain with the relative displacement set (Δx, Δy, Δz). The above-mentioned position technique may include features of: the initialization of the motion-sensing; the initialization of the position of the reference point; the correspondence between the operation range, where the selection unit 37 moves to mark, and the range of the image area 32; the compensation of the reference point, and so on. An operation program resident in a computer (not shown), coupled to the selection unit 37, may perform the technique. In an embodiment, the processing unit 39 built in the selection unit 37 may perform the technique.

Figure 6A:
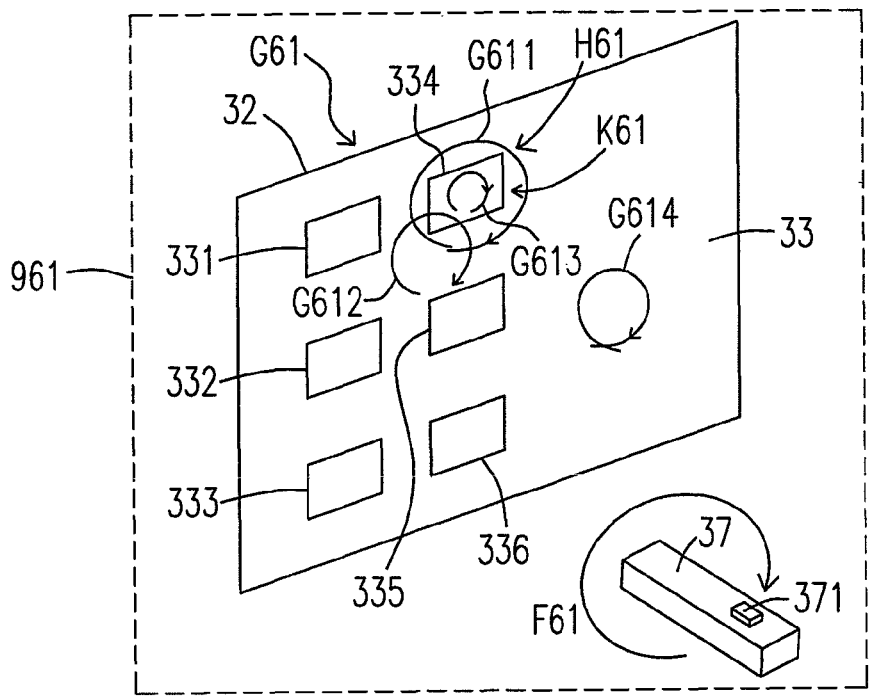
FIG. 6(a) and FIG. 6(b) are schematic diagrams showing selection configurations of the selection system according to the second embodiment of the present invention.
Figure 6B:
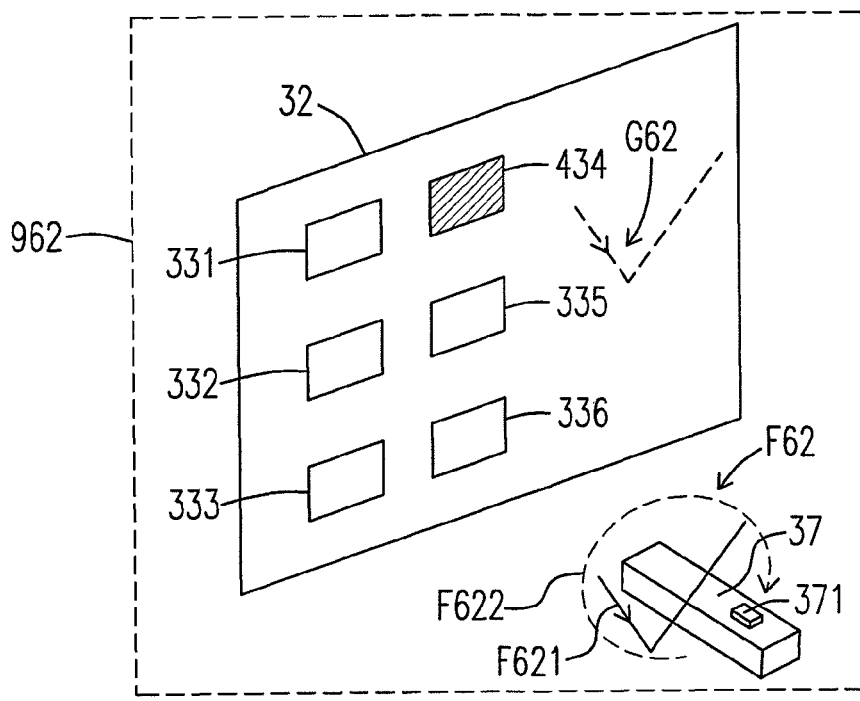

Please refer to FIG. 6(a) and FIG. 6(b), which are schematic diagrams showing selection configurations 961 and 962 of the selection system 93 according to the second embodiment of the present invention. As shown in FIG. 6(a), an image 33 is displayed and filled in the image area 32, and plural icons 331, 332, 333, 334, 335 and 336 are defined in the image 33. A locus G61 (may be one of loci G611, G612, G613 and G614) of the definable position 3A corresponds to a motion. F61. The following conditions are judged by means of a certain operation method. Whether the drawn locus G61 certainly encircles or passes through the coordinate of the icon 334 in the image area 32 or not? Whether the marked area H61 is partially overlapped with, entirely overlapped with or entirely covers the defined area K61 or not? The area H61 marked by the locus G61 and a centroid of the area H61 are calculated, and whether the centroid is located in the area K61 of the marked icon 334. If one of the above-mentioned conditions is true, the icon 334 is to be selected.

Under the present condition, as shown in FIG. 6(b), the color of the marked icon 334 can be changed (e.g. with the highlight or the blinking) and the marked icon 334 is replaced with an icon 434. Alternatively, the computer (not shown), coupled to the selection unit 37, or the selection unit 37 produces sound, emits light, or produces force feedback or vibration to remind the operator, who makes the motion F61, that the icon 334 is in the selected status.

After the marking motion completes, as shown in FIG. 6(b), the operator further makes a motion F62 to produce a message, which causes a preset function of the icon 334 to be performed. The motion F62 may includes at least one movement of drawing a check mark F621, a letter "X", a wavy line, a triangle, an arc or a circle. Alternatively, the motion F62 is that the wrist turns the selection unit 37 to produce a pitching motion, a yawing motion, or a rolling motion, or draw an arc or a circle F622 again. The selection unit 37 may convert the motion F62 into a locus G62 of the definable position 3A, and the locus G62 may be not shown. A preset acceleration-deceleration, a motion or a rotation modes is utilized to judge the acceleration-deceleration, the motion or the rotation modes of the locus G62 or the motion F62 for determining whether a preset function of the icon 334 or 434 is to be performed, wherein the locus G62 has the shape of the motion F62.

For instance, the accelerometer 382 may be used to sense the acceleration-deceleration distribution of the motion F62 or an inclination for the selection unit 37 with the motion F62; therefore, the accelerometer 382 can output the sub-signal S32 of the signal S3 to the processing unit 39 as shown in FIG. 3. The processing unit 39 analyzes an acceleration-deceleration distribution of the motion F62 according to the sub-signal S32 and an execution signal is formed to cause the preset function of the icon 434 to be performed. The execution signal may be similar to a conventional execution signal sent on condition that the left push button of the conventional mouse device is clicked twice quickly when the cursor is positioned in the desired icon, which cause a preset function of the desired icon to be performed.

Figure 7A:
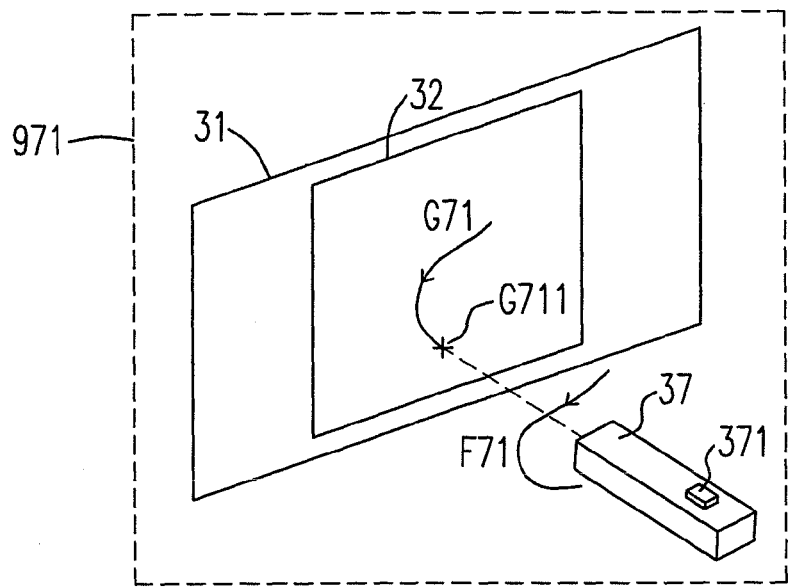
FIG. 7(a) and FIG. 7(b) are schematic diagrams showing position configurations of the selection system according to the second embodiment of the present invention.
Figure 7B:
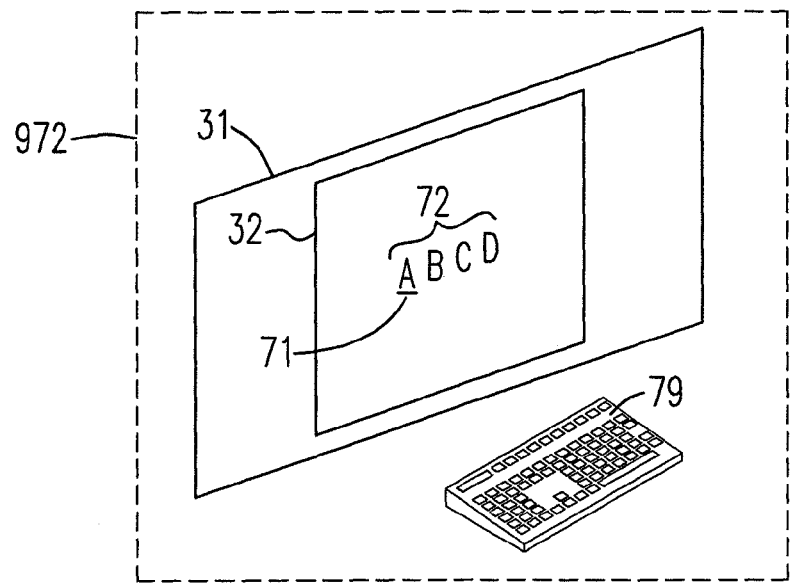
Figure 8A:
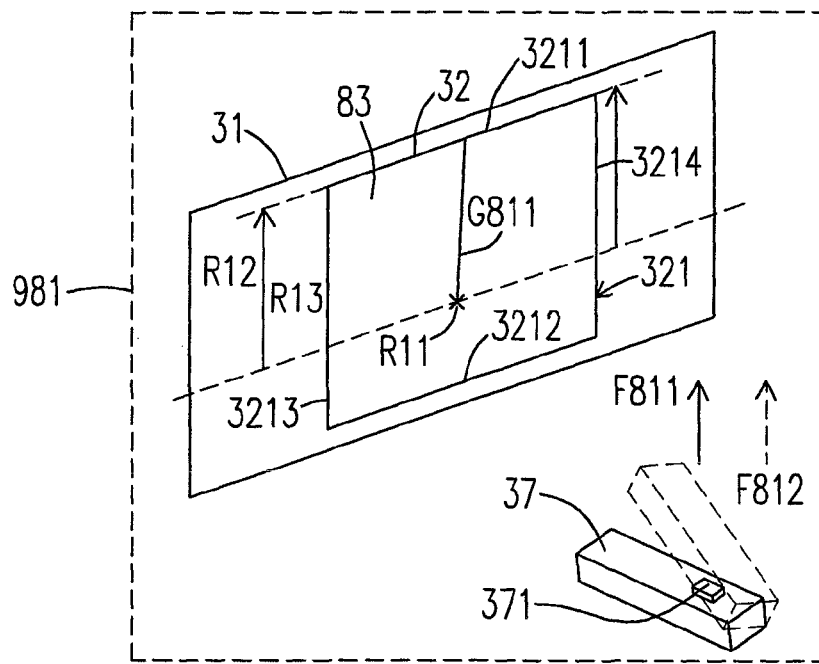
FIGS. 8(a), 8(b), 8(c) and 8(d) are schematic diagrams showing scroll configurations of the selection system according to the second embodiment of the present invention.
Figure 8B:
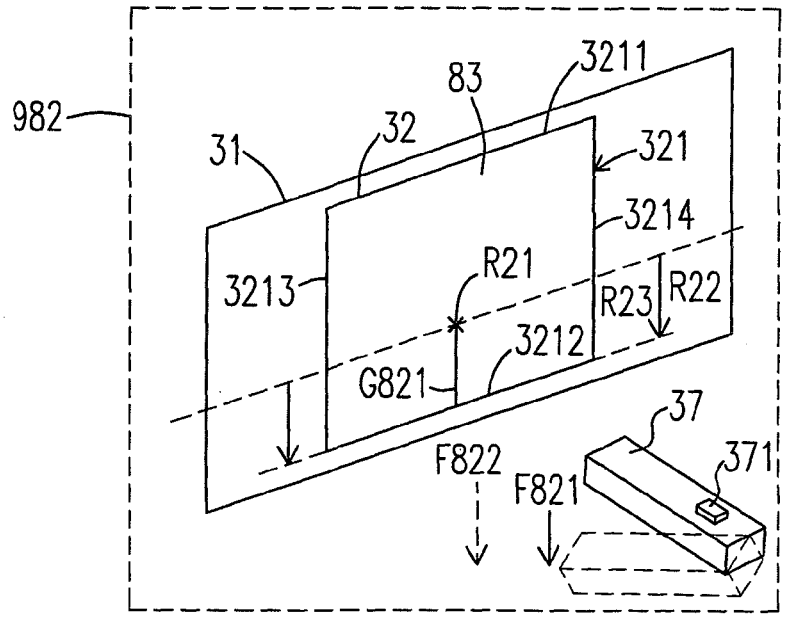
Figure 8C:
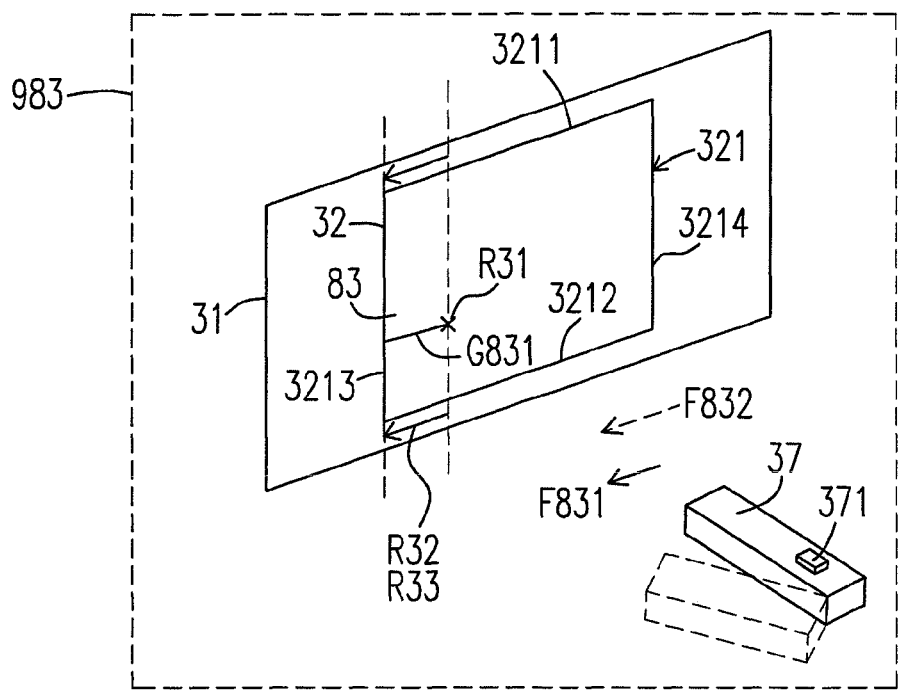
Figure 8D:
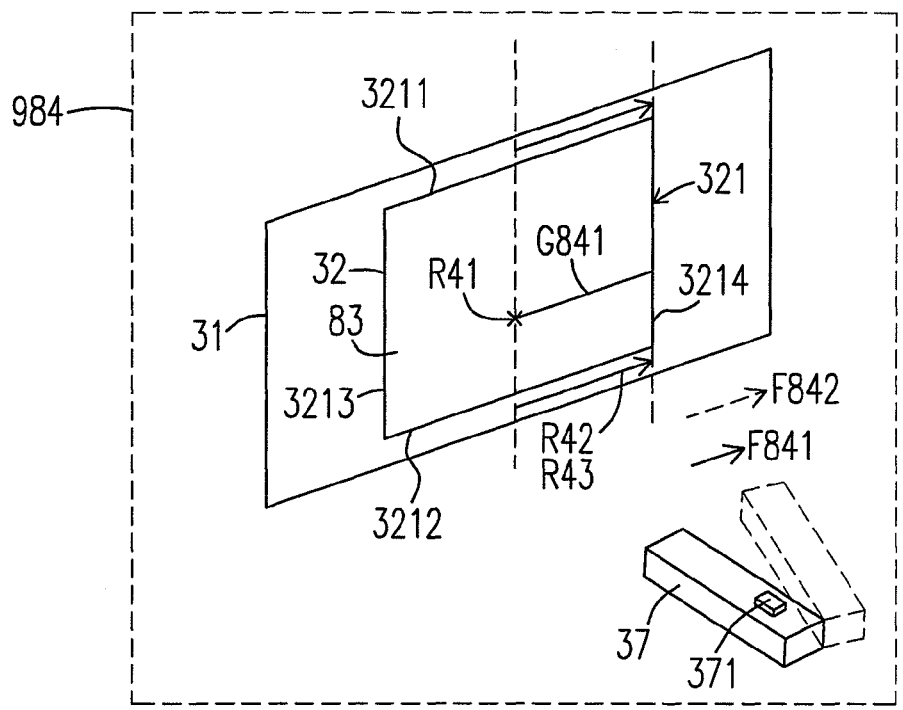

Please refer to FIG. 7(a) and FIG. 7(b), which are schematic diagrams showing position configurations 971 and 972 of the selection system 93 according to the second embodiment of the present invention. As shown in FIG. 7(a), the definable position 3A may be positioned to a certain position G711 in the image area 32 by the push button 371 of the selection unit 37. For instance, the definable position 3A moves to form a locus G71 in response to a motion F71 of the selection unit 37; when the definable position 3A sweeps to the certain position G711, the push button 371 is clicked once. In this way, the above-mentioned operation program can obtain the absolute coordinate (x, y, z) of the certain position G711, which is the terminating point swept by the selection unit 37 at present. As shown in FIG. 7(a), the definable position 3A is positioned to the certain position G711, and a keyboard 79 inputs data 72, as shown in FIG. 7(b), which have an input starting point 71 corresponding to the certain position G711.

Please refer to FIGS. 8(a), 8(b), 8(c) and 8(d), which are schematic diagrams showing scroll configurations 981, 982, 983 and 984 of the selection system 93 according to the second embodiment of the present invention. As shown, there is an image 83 displayed in the image area 32. The selection unit 37 is configured to have a motion (e.g. one of F811, F821, F831 and F841) to establish a starting point (e.g. one of R11, R21, R31 and R41) of the definable position 3A in the image area 32 and causes the image 83 to be scrolled in the image area 32 by the motion (e.g. one of F811, F821, F831 and F841). The motion may be an upward F811, a downward F821, a leftward F83 or a rightward F841 instantaneous motion. The gyroscope 381 or the accelerometer 382 is utilized to sense the above-mentioned motion in order to perform the scroll function.

As shown in FIG. 8(*a*) and FIG. 8(*b*), an up-down scroll operation is performed in the image area 32. The selection unit 37 causes an upward or a downward scroll operation to be performed by an upward F811 or a downward F821 instantaneous motion. As to the scrolling amount, a distance R13 between the position of the starting point R11 and the upper edge 3211 of the image area 32 represents a scrolling amount, which the image 83 scrolls upward. Besides, a distance R23 between the position of the starting point R21 and the lower edge 3212 of the image area 32 represents a scrolling amount, which the image 83 scrolls downward.

As shown in FIG. 8(*c*) and FIG. 8(*d*), a left-right scroll operation is performed in the image area 32. The selection unit 37 causes a leftward or a rightward scroll operation to be performed by a leftward F831 or a rightward F841 instantaneous motion. As to the scroll amount, a distance R33 between the position of the starting point R31 and the left edge 3213 of the image area 32 represents a scroll amount, which the image 83 scrolls leftward. Besides, a distance R43 between the position of the starting point R41 and the right edge 3214 of the image area 32 represents a scroll amount, which the image 83 scrolls rightward.

In an embodiment, the selection unit 37 is configured to have a motion (e.g. one of F811, F821, F831 and F841), converts the motion into a locus (e.g. one of G811, G821, G831 and G841 corresponding to F811, F821, F831 and F841 respectively) of the definable position 3A in the image area 32, wherein the locus is a line segment near one of a horizontal and a vertical line segments having a direction (e.g. one of R12, R22, R32 and R42) and a starting point (e.g. one of R11, R21, R31 and R41) within the image area 32. The selection unit 37 causes the image 83 displayed in the image area 32 to be scrolled by another motion (e.g. one of F812, F822, F832 and F842 corresponding to F811, F821, F831 and F841 respectively) according to the starting point and the direction of the line segment and a boundary 321 of the image area 32.

Figure 9:
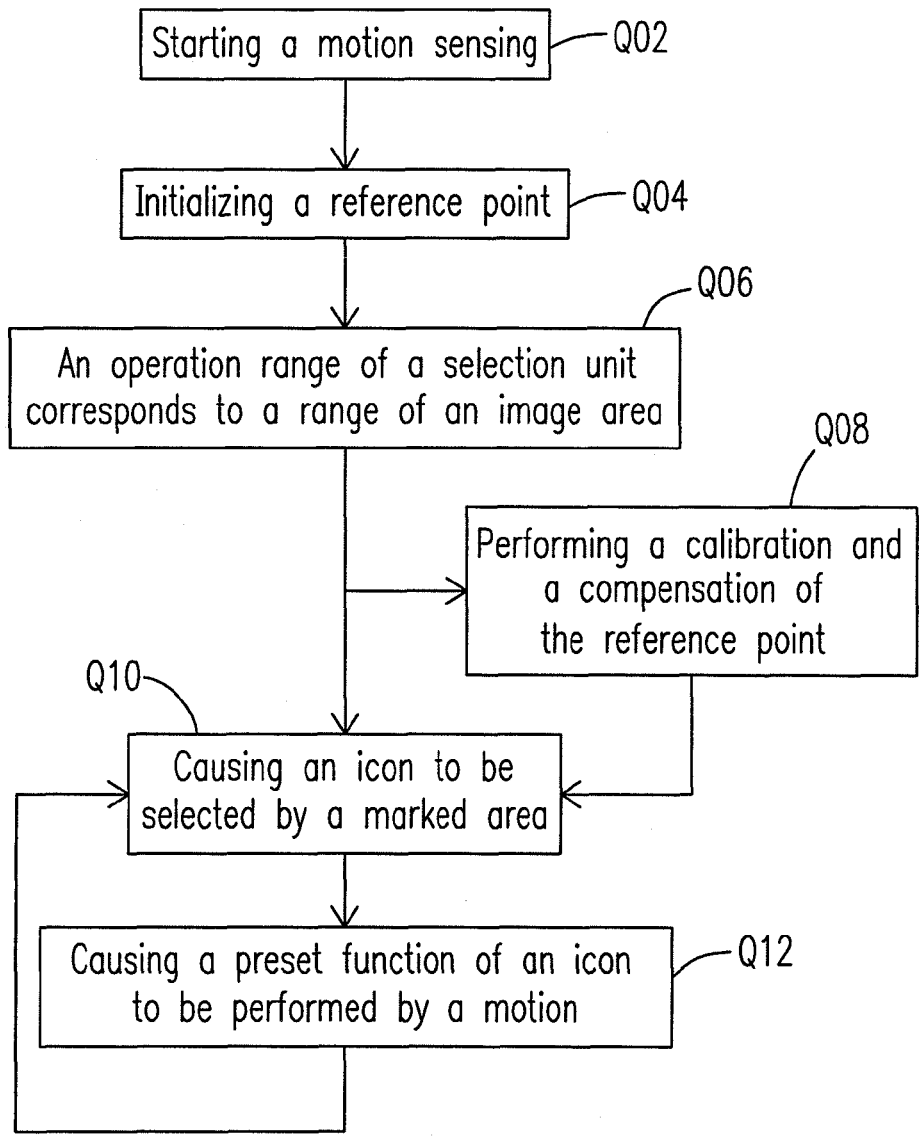
FIG. 9 is a flow diagram showing an operation of the selection system according to the second embodiment of the present invention.

Please refer to FIG. 9, which is a flow diagram showing an operation of the selection system 93 according to the second embodiment of the present invention. As shown in Step Q02, a motion sensing starts. In Q04, a reference point G421 for positioning is initialized; e.g., the reference point G421 of the locus G42 of the definable position 3A is initialized. In Q06, the operation range of the selection unit 37 corresponds to the range of the image area 32 for correlating the definable position 3A with a posture of the motion of the selection unit 37. In Q08, a calibration and a compensation of the reference point G421 is performed. In step Q10, a marked area H61 is utilized to cause the icon 334 to be selected. In step Q12, the motion F62 is utilized to cause a preset function of the icon 334 to be performed.

Please refer to FIG. 2 again. A selection method for selecting an icon 231 in an image area 22 is described according to the present invention. The method includes the following steps. A motion F21 is converted into a locus G21 in the image area 22. An area H21 in the image area 22 is determined according to the locus G21. And, the selection of the icon 231 is determined by the relations between the area H21 and an area K21 where the icon 231 is to be displayed in the image area 22.

Compared to the operation of the existing 3D air mouse device, the progresses of the present invention include that the operation of marking an area collocates with the natural motion of the wrist and the arm, and is utilized to cause the icon on the screen to be selected and cause the preset function of the icon to be performed, which is different from the existing technique on the market. In the existing technique, e.g. Gyration 3D remote controller or Logitech Air Mouse, a cursor or an object on the screen is moved to select the icon on the screen first, and then the active push button of the conventional mouse device is clicked twice quickly to cause the preset function of the icon to be performed.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A selection device for selecting an icon in an image area, comprising:
   a motion-sensing unit sensing a first motion and converting the first motion into a first signal; and
   a processing unit converting the first signal into a first trajectory in the image area, determining a first area in the image area according to the first trajectory, and determining whether the icon is to be selected according to the first area and a second area where the icon is to be displayed in the image area, wherein the first trajectory at least nearly encloses the first area.

2. A selection device according to claim 1, wherein the first motion is generated by at least one selected from a group consisting of a hand, an arm, a foot, a leg, a head, a neck, a shoulder and a waist.

3. A selection device for selecting an icon in an image area, comprising:
   a selection unit having a first motion, converting the first motion into a first trajectory in the image area, determining a first area of the image area according to the first trajectory, and determining whether the icon is to be selected according to the first area and a second area where the icon is to be displayed in the image area, wherein the first trajectory at least nearly encloses the first area.

4. A selection device according to claim 3, wherein a definable position is defined within the image area and the selection unit comprises:
   a motion-sensing unit converting the first motion into a first signal; and
   a processing unit converting the first signal into the first trajectory of the definable position, determining the first area according to the first trajectory, and determining whether the icon is to be selected according to the first area and the second area.

5. A selection device according to claim 4, wherein the motion-sensing unit comprises:
   a gyroscope sensing the first motion for producing the first signal.

6. A selection device according to claim 4, wherein the motion-sensing unit comprises:
   a gyroscope having at least two sensing degrees of freedom and sensing the first motion for producing a first portion of the first signal; and
   an accelerometer having at least two sensing degrees of freedom and sensing the first motion for producing a second portion of the first signal.

7. A selection device according to claim 4, wherein the processing unit includes one selected from a group consisting of a microcontroller, a microprocessor, a digital signal processor and a central processing unit.

8. A selection device according to claim 3, wherein:
the first motion is formed by a hand driving the selection unit; and
the first motion includes at least one of a three-dimensional motion and a two-dimensional motion.

9. A selection device according to claim 3, wherein:
the first trajectory includes at least one selected from a group consisting of a first arc having an arc angle, a combination of a second arc and a first line segment, and plural second line segments; and
the arc angle of the first arc is in a degree being one selected from a group consisting of 360°, near 360°, and beyond 360° when the first trajectory is the first arc.

10. A selection device according to claim 3, wherein:
the first area includes a closed area; and
the selection unit causes the icon to be selected when in a specific condition, wherein the specific condition is one selected from a group consisting of:
a first condition that the first and the second areas are partially overlapping,
a second condition that the first and the second areas are entirely overlapping,
a third condition that the first area is entirely covering the second area,
a fourth condition that a centroid of the first area is within the second area,
a fifth condition that the first trajectory passes through the second area, and
a sixth condition that the first trajectory touches the second area.

11. A selection device according to claim 3, wherein:
the selection unit further has a second motion, analyzes an acceleration-deceleration distribution of the second motion, and determines whether a preset function of the icon is performed after the selection unit conforms a selected status of the icon; and
the second motion is one selected from a group consisting of movements of drawing a check mark, a letter "X", a wavy line, a triangle, an arc and a circle.

12. A selection device according to claim 3, wherein:
the selection unit further has a second motion, converts the second motion into a second trajectory in the image area, and determines whether a preset function of the icon is performed according to the second trajectory after the selection unit confirms a selected status of the icon; and
the second trajectory is one selected from a group consisting of a check mark, a letter "X" and a circle-shaped mark.

13. A selection device according to claim 12, wherein:
the selection unit establishes a starting point in the image area and causes an image displayed in the image area to be scrolled by a third motion being a movement from the starting point towards a boundary of the image area.

14. A selection device according to claim 13, wherein:
the third motion is one selected from a group consisting of an upward, a downward, a leftward and a rightward instantaneous motions; and the third motion is sensed by one of a gyroscope and an accelerometer.

15. A selection method for selecting an icon in an image area, comprising steps of:
converting a first motion into a first trajectory in the image area;
determining a first area in the image area according to the first trajectory; and
determining whether the icon is to be selected according to the first area and a second area where the icon is to be displayed in the image area, wherein the first trajectory at least nearly encloses the first area.

16. A selection method according to claim 15, further comprising steps of:
converting the first motion into a first signal; and
converting the first signal into the first trajectory.

17. A selection method according to claim 15, wherein a definable position is defined within the image area, the selection method further comprising steps of:
starting the first motion;
initializing a reference point of the first trajectory of the definable position;
correlating the definable position with a posture of the first motion; and
performing a calibration and a compensation of the reference point.

18. A selection method according to claim 15, further comprising a step of:
causing the icon to be selected when in a specific condition, wherein the specific condition is one selected from a group consisting of:
a first condition that the first and the second areas are partially overlapping,
a second condition that the first and the second areas are entirely overlapping,
a third condition that the first area is entirely covering the second area, and
a fourth condition that a centroid of the first area is within the second area.

19. A selection method according to claim 15, wherein after the icon is selected, the method further comprises steps of:
converting a second motion into a second trajectory in the image area; and
determining whether a preset function of the icon is performed according to the second trajectory.

20. A selection method according to claim 19, wherein after the preset function of the icon was performed, the method further comprises steps of:
converting a third motion into a third trajectory in the image area, wherein the third trajectory is a line segment near one of a horizontal and a vertical line segments having a direction and a starting point within the image area; and
causing an image displayed in the image area to be scrolled by a fourth motion according to the starting point and the direction of the line segment and a boundary of the image area.

* * * * *